Sept. 6, 1949. S. FOGEL 2,481,302
TRANSPARENT DISPLAY CONTAINER WITH SLIDE
Filed June 6, 1946
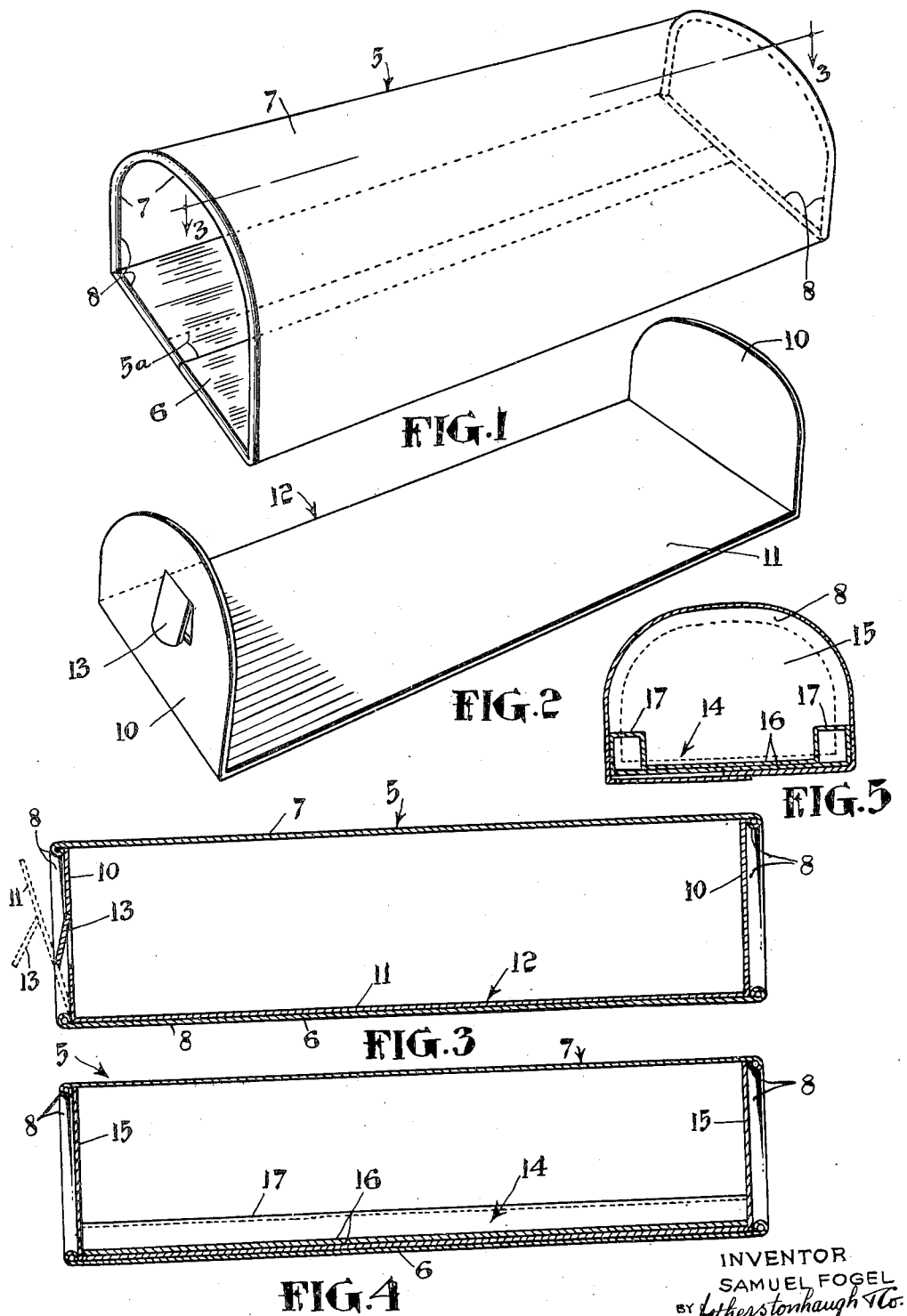
INVENTOR
SAMUEL FOGEL
BY Featherstonhaugh &Co.
ATTORNEYS Patented Sept. 6, 1949

2,481,302

UNITED STATES PATENT OFFICE 2,481,302

TRANSPARENT DISPLAY CONTAINER WITH SLIDE

Samuel Fogel, Montreal, Quebec, Canada

Application June 6, 1946, Serial No. 674,887

3 Claims. (Cl. 206—45.34)

This invention resides in the provision of a display package comprising a transparent outer casing having end openings closed by end walls of a separately formed article-supporting tray forced into the casing through one of said openings, the ends of the casing being formed with continuous inwardly projecting beads designed to retain the inserted tray in place.

According to a preferred embodiment of the invention, the outer casing is formed by bending a single sheet of transparent material bent to provide a flat bottom wall and an upwardly arched circularly curved wall structure forming the top and sides of the casing, the casing forming sheet being rolled at the end openings of the casing to provide inwardly projecting beads extending continuously around said openings. The article-supporting tray is made of opaque material and comprises a bottom portion and upwardly directed end walls which are slightly larger than the openings defined by the beads at the ends of the casing. The tray is inserted in the casing by forcing the end walls of the tray inwardly past the bead at one open end of the casing. The length of the tray is such that the end walls thereof bear against the inner sides of the beads surrounding the end openings of the casing to close said openings when the tray is fully inserted in the casing.

Other characteristic features and advantages of the invention will be apparent from the following detailed description of the accompanying drawings, in which—

Figure 1 is a perspective view of the transparent outer casing of a display package embodying the invention.

Figure 2 is a perspective view of one form of article-supporting tray adapted to be inserted in the transparent casing.

Figure 3 is a longitudinal sectional view showing the casing and tray in assembled relation.

Figure 4 is a view similar to Figure 3, but showing a modified type of tray inserted in the transparent casing; and Figure 5 is a transverse sectional view taken substantially along line 5—5 of Figure 4.

Referring more particularly to Figures 1 to 3 inclusive, 5 designates a transparent casing comprising a flat bottom wall 6 and an upwardly arched circularly curved wall structure 7 forming the top and sides of the casing.

As here shown, casing 5 is open at both ends and is formed by first curving a single sheet of transparent plastic material to form the curved wall structure 7 and then bending portions of the sheet inwardly into overlapping relation with each other to form the flat bottom wall 6, the overlapping portions 5a of the sheet being permanently joined together in any suitable manner. At the end openings of the casing, the edges of the casing forming sheet are rolled to form inwardly projecting beads 8 extending continuously around said openings.

As shown in Figure 3, the end openings of casing 5 are closed by end walls 10 extending upwardly from the bottom wall 11 of an opaque article-supporting tray 12 which is inserted in the casing by forcing it inwardly past the bead 8 at one end of the casing. The length of the tray 12 is such that the end walls 10 bear against the inner sides of the beads 8 to close the end openings of the casing when the tray is fully inserted therein. In this connection, it will be understood that the end walls 10 of the tray have the same contour but are made slightly larger than the casing openings defined by the beads 8 so that the tray can be inserted in the casing only by forcing it inwardly past one of said beads.

One end wall 10 of tray 12 is provided with a pull tab 13 to enable the tray to be forcibly removed from the casing 5 by pulling outwardly on the tab 13.

In the modified assembly shown in Figures 4 and 5, the inserted article-supporting tray 14 is designed so that after being inserted in the casing 5 it cannot be removed except by destroying the casing. In this case, the end walls 15 of the tray extend upwardly from a relatively stiff two-ply bottom wall 16 bounded at the sides by hollow side walls 17 which are substantially rectangular in cross section. This type of tray is not provided with any pull tab corresponding to the previously mentioned pull tab 13 and is of such stiff construction that it cannot be removed from the outer casing after being inserted therein by forcing the tray structure inwardly past the bead 8 at one end of the casing. In this connection, it will be understood that by using the curved edge of one of the end walls 15 as a leading edge, the tray may be readily forced into the casing past one of the beads 8. However, after the tray has been finally positioned within the casing, with the end walls 15 thereof bearing against the inner sides of the beads 8, it is practically impossible to remove the tray without destroying the outer casing.

Having thus described the nature of my invention and several preferred embodiments thereof, it will be understood that various modi-

I claim:

1. A display container comprising an outer casing having a bottom wall and transparent top and side portions, the ends of said casing being open and formed to provide continuous inwardly projecting slide-retaining beads and a separately formed article-supporting slide adapted to be slidably inserted in the casing by forcing it past one of said beads, said slide comprising a bottom article-supporting wall and upwardly extending end walls hingedly joined to the ends of said article-supporting wall, said end walls being slightly larger than the openings defined by said beads and being arranged to bear against the inner sides of the beads in the inserted position of the slide to close the ends of said casing and to cooperate with the beads in resisting relative endwise positioning of the casing and slide.

2. A display container as set forth in claim 1, in which said end walls are free except along their hinged connections to the article-carrying wall.

3. A display container as set forth in claim 1, in which said slide includes hollow rectangular side portions extending along the side edges of said article-carrying wall between said end walls.

SAMUEL FOGEL.

REFERENCES CITED

The following references are of record in the file of this patent:

UNITED STATES PATENTS

| Number | Name | Date |
|---|---|---|
| 1,989,944 | Quigg | Feb. 5, 1935 |
| 1,991,425 | Sherman | Feb. 19, 1935 |
| 2,170,723 | Marx | Aug. 22, 1939 |
| 2,301,042 | Hanson | Nov. 3, 1942 |
| 2,316,384 | Abramson | Apr. 13, 1943 |

FOREIGN PATENTS

| Number | Country | Date |
|---|---|---|
| 456,067 | Great Britain | Nov. 3, 1936 |